United States Patent
Tung et al.

(10) Patent No.: US 10,067,014 B1
(45) Date of Patent: Sep. 4, 2018

(54) FORCE SENSOR

(71) Applicant: GlobalMEMS Co., Ltd., Grand Cayman (KY)

(72) Inventors: Hsi-Wen Tung, Taipei (TW); Ming-Ching Wu, Taoyuan (TW)

(73) Assignee: GlobalMEMS Co., Ltd., Grand Cayman (KY)

( * ) Notice: Subject to any disclaimer, the term of this patent is extended or adjusted under 35 U.S.C. 154(b) by 0 days.

(21) Appl. No.: 15/494,545

(22) Filed: Apr. 24, 2017

(30) Foreign Application Priority Data

Mar. 3, 2017 (TW) ............... 106106952 A

(51) Int. Cl.
| | | |
|---|---|---|
| *G01L 1/22* | (2006.01) | |
| *G01L 1/26* | (2006.01) | |
| *G01L 1/00* | (2006.01) | |

(52) U.S. Cl.
CPC ........... *G01L 1/26* (2013.01); *G01L 1/005* (2013.01)

(58) Field of Classification Search
CPC ................................. G01L 1/005; G01L 1/26
USPC ........................................................ 73/862.68
See application file for complete search history.

(56) References Cited

U.S. PATENT DOCUMENTS

| | | | | |
|---|---|---|---|---|
| 6,788,291 B2* | 9/2004 | Burry | ................... | G06F 3/0213 |
| | | | | 341/20 |
| 2007/0227257 A1* | 10/2007 | Harish | .................... | G01G 7/06 |
| | | | | 73/780 |
| 2008/0137876 A1* | 6/2008 | Kassal | .................... | A61B 7/04 |
| | | | | 381/67 |
| 2010/0095435 A1* | 4/2010 | Yang | .................... | A43B 3/0005 |
| | | | | 2/244 |
| 2012/0174680 A1 | 7/2012 | Wade et al. | | |
| 2014/0007705 A1 | 1/2014 | Campbell et al. | | |
| 2014/0275873 A1* | 9/2014 | Fries | .................. | A61B 5/14552 |
| | | | | 600/323 |

FOREIGN PATENT DOCUMENTS

| | | |
|---|---|---|
| CN | 205785644 | 12/2016 |
| TW | I380413 | 12/2012 |

OTHER PUBLICATIONS

Hsi-Wen Tung et al.,"MEMS Force Sensor and Force Sensing Apparatus",Unpublished U.S. Appl. No. 15/134,395, filed Apr. 21, 2016.

"Office Action of Taiwan Counterpart Application," dated Nov. 22, 2017, p. 1-p. 5.

* cited by examiner

*Primary Examiner* — Max Noori
(74) *Attorney, Agent, or Firm* — JCIPRNET

(57) ABSTRACT

A force sensor including a sensing element and a circuit board is provided. The sensing element has a top surface and a bottom surface opposite to each other and has a sensing portion, wherein the sensing portion is located at the top surface. The circuit board is disposed above the top surface and electrically connected to the sensing element, Wherein the sensing portion is adapted to generate a sensing signal through an external force transferred from the circuit board to the top surface.

11 Claims, 5 Drawing Sheets

FORCE SENSOR

CROSS-REFERENCE TO RELATED APPLICATION

This application claims the priority benefit of Taiwan application serial no. 106106952, filed on Mar. 3, 2017. The entirety of the above-mentioned patent application is hereby incorporated by reference herein and made a part of this specification.

BACKGROUND OF THE INVENTION

Field of the Invention

The invention relates to a sensor and more particularly relates to a force sensor.

Description of Related Art

The micro-electro-mechanical system (MEMS) technology is a design based on a miniaturized electromechanical integration structure. At present, the common MEMS technology is mainly used in three fields, i.e., micro sensors, micro actuators, and micro structures, among which the micro sensors are for converting a change of the external environment (e.g., force, pressure, sound, and speed) into an electrical signal (e.g., a voltage or current) to realize environmental sensing functions, such as force sensing, pressure sensing, sound sensing, acceleration sensing, and so on. The micro sensors can be manufactured by using the semiconductor manufacturing technology and be integrated with an integrated circuit, and thus are more competitive. Therefore, MEMS sensors and sensing devices using MEMS sensors are the main trend of development of MEMS.

Take a MEMS force sensor for example, its sensing element is used to sense an applied pressing force, and if the sensing element is exposed to the pressing force directly, the sensing element may be damaged easily. To address such an issue, an additional cover may be disposed to cover the sensing element and bear the pressing force, but it would increase the overall thickness and production cost of the sensor. Hence, how to protect the sensing element of the force sensor and maintain the sensing performance thereof without increasing the overall thickness and production cost of the sensor is an important issue in the field of MEMS force sensing.

SUMMARY OF THE INVENTION

The invention provides a force sensor that is capable of protecting a sensing element of the force sensor as well as maintaining the sensing performance without increasing the overall thickness and production cost of the force sensor.

The force sensor of the invention includes a sensing element and a circuit board. The sensing element has a top surface and a bottom surface opposite to each other and includes a sensing portion. The sensing portion is located at the top surface. The circuit board is disposed above the top surface and electrically connected to the sensing element. The sensing portion is adapted to generate a sensing signal through an external force transferred from the circuit board to the top surface.

In an embodiment of the invention, the circuit board includes a peripheral portion and a central portion. The central portion is surrounded by the peripheral portion and is aligned with the sensing portion. The sensing element supports the peripheral portion, and the sensing portion is adapted to generate the sensing signal through the external force transferred from the central portion to the top surface.

In an embodiment of the invention, the force sensor further includes a plurality of conductive bumps disposed between the top surface and the circuit board. The sensing element supports the circuit board through the conductive bumps and is electrically connected to the circuit board through the conductive bumps.

In an embodiment of the invention, the force sensor further includes a gel. The gel covers at least a portion of the sensing element.

In an embodiment of the invention, the gel is filled between the top surface and the circuit board, and the external force is transferred to the sensing portion through the gel.

In an embodiment of the invention, the gel includes a first gel material and a second gel material, and the first gel material is aligned with the sensing portion and the second gel material surrounds the first gel material.

In an embodiment of the invention, the gel includes a third gel material, and the third gel material extends from the circuit board to the bottom surface to cover the sensing element.

In an embodiment of the invention, the circuit board has an opening, and the opening is aligned with the sensing portion and at least a portion of the gel is located in the opening and adapted to receive the external force.

In an embodiment of the invention, the gel protrudes from the opening.

In an embodiment of the invention, the circuit board is adapted to receive the external force.

In an embodiment of the invention, the force sensor further includes a pressing element. The pressing element is disposed on the circuit board and aligned with the sensing portion, and the pressing element is adapted to receive the external force.

In an embodiment of the invention, the force sensor further includes a signal processor. The signal processor is disposed on the circuit board and electrically connected to the circuit board.

In an embodiment of the invention, the circuit board is a rigid circuit board or a flex circuit board.

Based on the above, in the force sensor of the invention, the existing circuit board is disposed above the top surface of the sensing element, such that the sensing portion of the sensing element is shielded by the circuit board. Thus, in addition to performing the electrical function, the circuit board further serves as a structure that covers the sensing element and bears the pressing force. Accordingly, it is not required to additionally dispose a cover above the sensing element to protect the sensing element, and the sensing element of the force sensor is protected while the sensing performance thereof is maintained without increasing the overall thickness and production cost of the force sensor.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
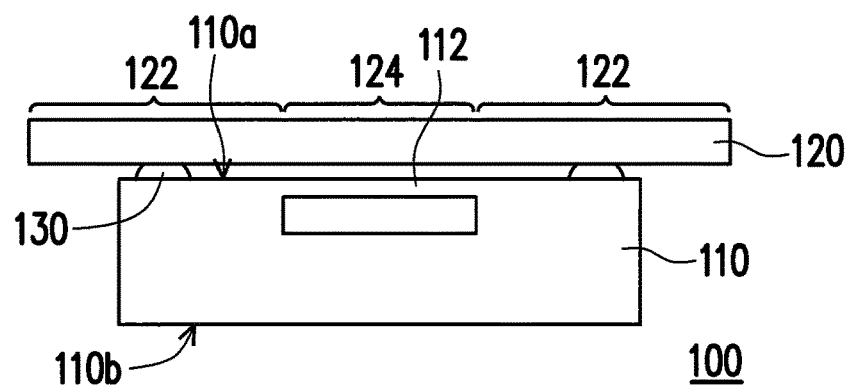
FIG. 1 is a cross-sectional view of a force sensor according to an embodiment of the invention.

FIG. 1 is a cross-sectional view of a force sensor according to an embodiment of the invention. Referring to FIG. 1, a force sensor 100 of this embodiment is a MEMS force sensor, for example, and includes a sensing element 110 and a circuit board 120. The sensing element 110 has a top surface 110a and a bottom surface 110b opposite to each other and includes a sensing portion 112. The sensing portion 112 is located at the top surface 110a. The sensing element 110 may be a piezoresistive sensing element, a capacitive sensing element, or other suitable types of sensing elements. Nevertheless, the invention is not limited thereto. The circuit board 120 is disposed above the top surface 110a of the sensing element 110 and electrically connected to the sensing element 110. The sensing portion 112 of the sensing element 110 is adapted to generate a sensing signal through an external force F transferred from the circuit board 120 to the top surface 110a of the sensing element 110. The force sensor 100 is applicable to a device having a touch function, so as to determine the strength of the user's touch by a force sensing function of the force sensor 100. Nevertheless, the invention is not limited thereto. The force sensor 100 is also applicable to other types of devices. In addition, the circuit board 120 may be a rigid circuit board or a flex circuit board. Nevertheless, the invention is not limited thereto, either.

According to the configuration described above, in the force sensor 100, the existing circuit board 120 is disposed above the top surface 110a of the sensing element 110, such that the sensing portion 112 of the sensing element 110 is shielded by the circuit board 120. Thus, in addition to performing an electrical function, the circuit board 120 further serves as a structure that covers the sensing element 110 and bears a pressing force. Accordingly, it is not required to additionally dispose a cover above the sensing element 110 to protect the sensing element 110. Consequently, the sensing element 110 of the force sensor 100 is protected and the sensing performance thereof is maintained without increasing the overall thickness and production cost of the force sensor 100.

Figure 2:
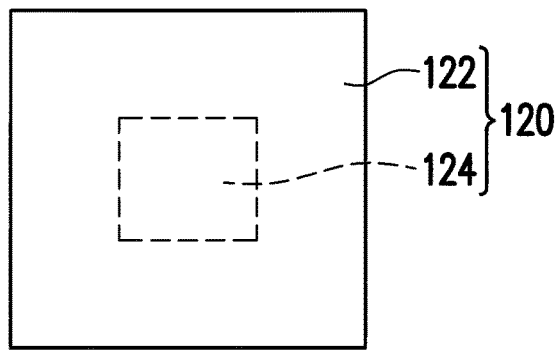
FIG. 2 is a top view of the circuit board of FIG. 1.
Figure 3:
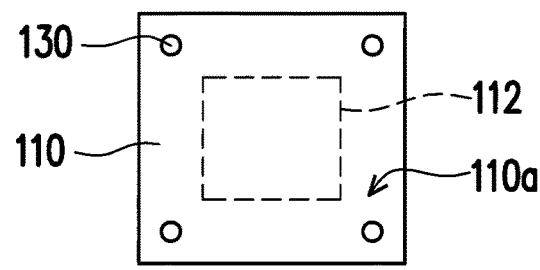
FIG. 3 is a top view of the sensing element and conductive bumps of FIG. 1.

A specific structure of the force sensor 100 according to this embodiment is described in detail hereinafter. FIG. 2 is a top view of the circuit board of FIG. 1. FIG. 3 is a top view of the sensing element and conductive bumps of FIG. 1. The circuit board 120 of this embodiment, as shown in FIG. 1 and FIG. 2, includes a peripheral portion 122 and a central portion 124. The central portion 124 is surrounded by the peripheral portion 122 and is aligned with the sensing portion 112 as shown in FIG. 1 and FIG. 3. The force sensor 100 further includes a plurality of conductive bumps 130 disposed between the top surface 110a of the sensing element 110 and the circuit board 120. The sensing element 110 supports the peripheral portion 122 of the circuit board 120 through the conductive bumps 130, and is electrically connected to the circuit board 120 through the conductive bumps 130, so as to transmit the sensing signal from the sensing element 110 to the circuit board 120. The central portion 124 of the circuit board 120 is adapted to receive the external force F, and the sensing portion 112 of the sensing element 110 is adapted to generate the sensing signal through the external force F transferred from the central portion 124 of the circuit board 120 to the top surface 110a of the sensing element 110.

Figure 4:
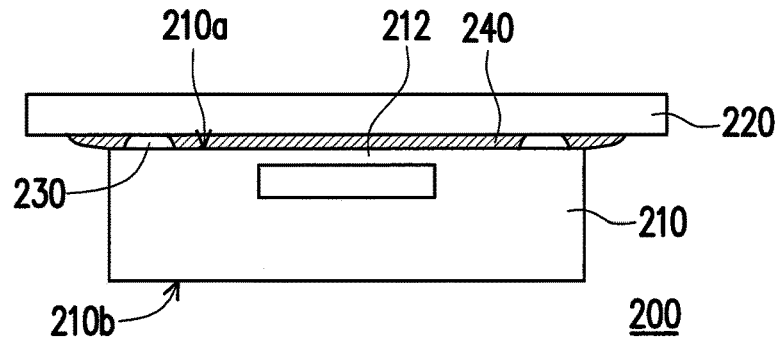
FIG. 4 is a cross-sectional view of a force sensor according to another embodiment of the invention.

FIG. 4 is a cross-sectional view of a force sensor according to another embodiment of the invention. In a force sensor 200 shown in FIG. 4, a sensing element 210, a top surface 210a, a bottom surface 210b, a sensing portion 212, a circuit board 220, and conductive bumps 230 have configurations and functions similar to those of the sensing element 110, the top surface 110a, the bottom surface 110b, the sensing portion 112, the circuit board 120, and the conductive bumps 130 of FIG. 1, and thus details thereof are not repeated hereinafter. A difference between the force sensor 200 and the force sensor 100 is that the force sensor 200 further includes a gel 240 that covers a portion of the sensing element 210. More specifically, the gel 240 is filled between the top surface 210a of the sensing element 210 and the circuit board 220, and an external force is adapted to be transferred to the sensing portion 212 of the sensing element 210 sequentially through the circuit board 220 and the gel 240. The gel 240 may be formed by curing a heat curing adhesive, a light curing adhesive, or other suitable types of adhesive materials. Nevertheless, the invention is not limited thereto.

Figure 5:
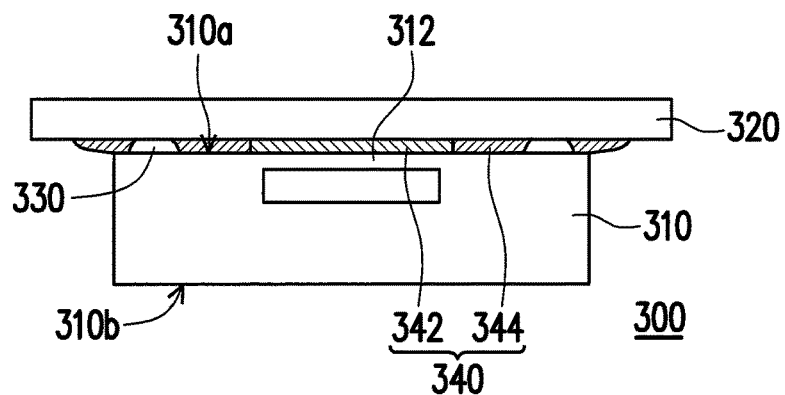
FIG. 5 is a cross-sectional view of a force sensor according to another embodiment of the invention.

FIG. 5 is a cross-sectional view of a force sensor according to another embodiment of the invention. In a force sensor 300 shown in FIG. 5, a sensing element 310, a top surface 310a, a bottom surface 310b, a sensing portion 312, a circuit board 320, conductive bumps 330, and a gel 340 have configurations and functions similar to those of the sensing element 210, the top surface 210a, the bottom surface 210b, the sensing portion 212, the circuit board 220, the conductive bumps 230, and the gel 240 of FIG. 4, and thus details thereof are not repeated hereinafter. A difference between the force sensor 300 and the force sensor 200 is that the gel 340 further includes a first gel material 342 and a second gel material 344, wherein the first gel material 342 is aligned with the sensing portion 312 of the sensing element 310 and the second gel material 344 surrounds the first gel material 342. A hardness of the second gel material 344 is greater than a hardness of the first gel material 342, for example, such that the first gel material 342 is softer and more elastically deformable to efficiently transfer an external force to the sensing portion 312 of the sensing element 310. Moreover, the second gel material 344 that has the greater hardness firmly covers the conductive bumps 330. In other embodiments, the hardness of the second gel material 344 may not be greater than the hardness of the first gel material 342. Nevertheless, the invention is not limited thereto. The first gel material 342 and the second gel material 344 may be formed by curing a heat curing adhesive, a light curing adhesive, or other suitable types of adhesive materials. Nevertheless, the invention is not limited thereto.

Figure 6:
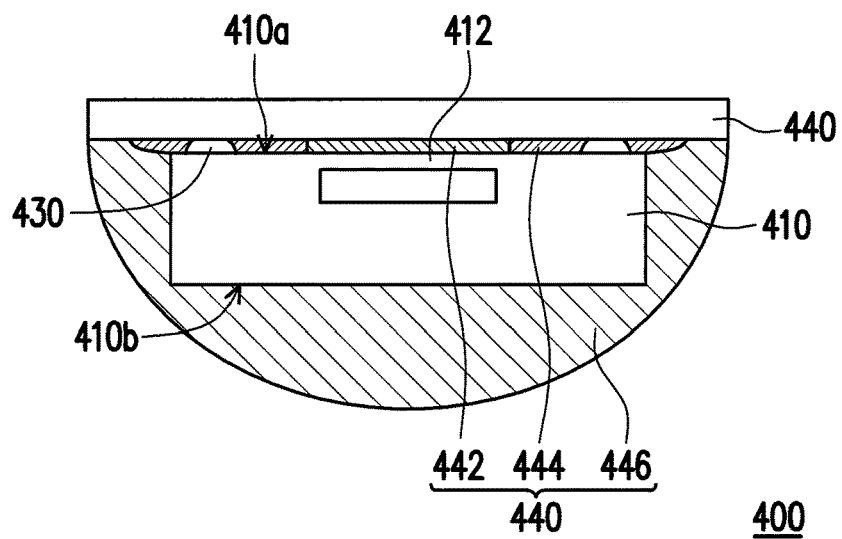
FIG. 6 is a cross-sectional view of a force sensor according to another embodiment of the invention.

FIG. 6 is a cross-sectional view of a force sensor according to another embodiment of the invention. In a force sensor 400 shown in FIG. 6, a sensing element 410, a top surface 410a, a bottom surface 410b, a sensing portion 412, a circuit board 420, conductive bumps 430, a gel 440, a first gel material 442, and a second gel material 444 have configurations and functions similar to those of the sensing element 310, the top surface 310a, the bottom surface 310b, the sensing portion 312, the circuit board 320, the conductive bumps 330, the gel 340, the first gel material 342, and the second gel material 344 of FIG. 5, and thus details thereof are not repeated hereinafter. A difference between the force sensor 400 and the force sensor 300 is that the gel 440 further includes a third gel material 446 that extends from the circuit board 420 to the bottom surface 410b of the sensing element 410 to cover the sensing element 410, so as to achieve protection of the sensing element 410. The third gel material 446 may be formed by curing a heat curing adhesive, a light curing adhesive, or other suitable types of adhesive materials. Nevertheless, the invention is not limited thereto.

Figure 7:
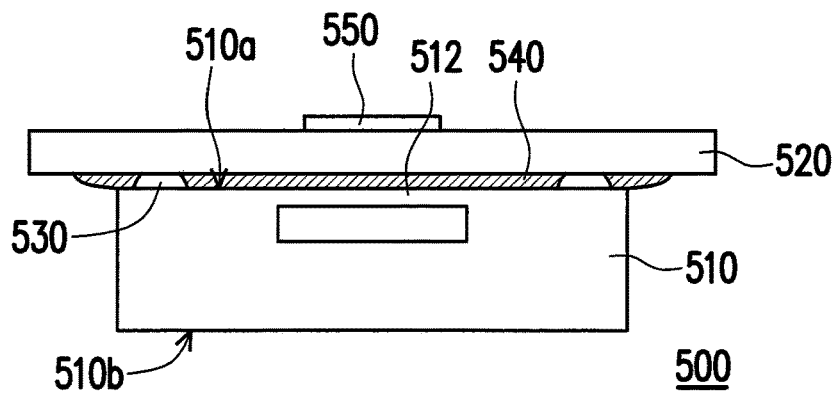
FIG. 7 is a cross-sectional view of a force sensor according to another embodiment of the invention.

FIG. 7 is a cross-sectional view of a force sensor according to another embodiment of the invention. In a force sensor 500 shown in FIG. 7, a sensing element 510, a top surface 510a, a bottom surface 510b, a sensing portion 512, a circuit board 520, conductive bumps 530, and a gel 540 have configurations and functions similar to those of the sensing element 210, the top surface 210a, the bottom surface 210b, the sensing portion 212, the circuit board 220, the conductive bumps 230, and the gel 240 of FIG. 4, and thus details thereof are not repeated hereinafter. A difference between the force sensor 500 and the force sensor 200 is that the force sensor 500 further includes a pressing element 550 that is disposed on the circuit board 520 and aligned with the sensing portion 512 of the sensing element 510. The pressing element 550 is adapted to receive an external force and transfer the external force to the sensing portion 512 of the sensing element 510 through the circuit board 520 and the gel 540.

Figure 8:
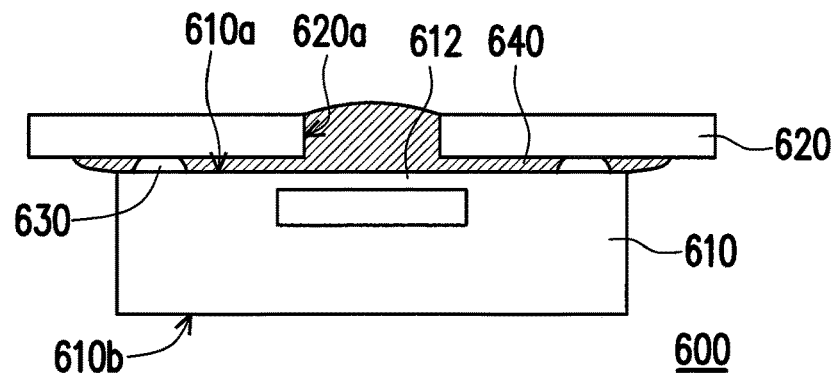
FIG. 8 is a cross-sectional view of a force sensor according to another embodiment of the invention.

FIG. 8 is a cross-sectional view of a force sensor according to another embodiment of the invention. In a force sensor 600 shown in FIG. 8, a sensing element 610, a top surface 610a, a bottom surface 610b, a sensing portion 612, a circuit board 620, conductive bumps 630, and a gel 640 have configurations and functions similar to those of the sensing element 210, the top surface 210a, the bottom surface 210b, the sensing portion 212, the circuit board 220, the conductive bumps 230, and the gel 240 of FIG. 4, and thus details thereof are not repeated hereinafter. A difference between the force sensor 600 and the force sensor 200 is that the circuit board 620 has an opening 620a that is aligned with the sensing portion 612 of the sensing element 610. A portion of the gel 640 is located in the opening 620a of the circuit board 620 and protrudes from the opening 620a. The gel 640 that protrudes from the opening 620a is adapted to receive an external force, so as to transfer the external force from the opening 620a of the circuit board 620 to the top surface 610a of the sensing element 610 to reach the sensing portion 612.

Figure 9:
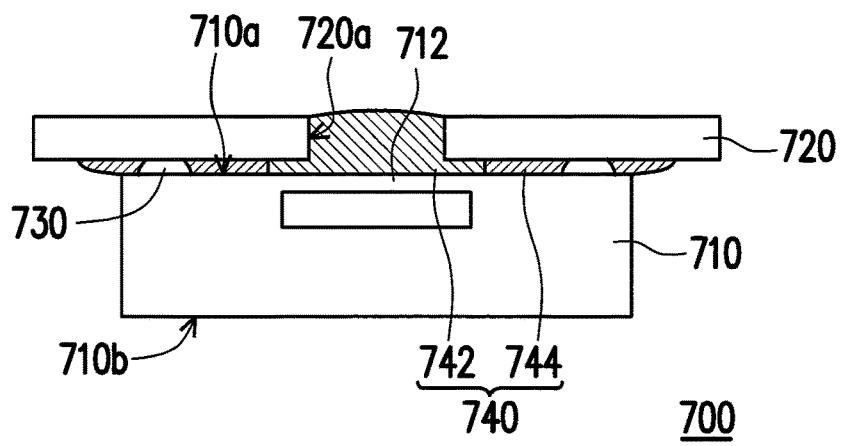
FIG. 9 is a cross-sectional view of a force sensor according to another embodiment of the invention.

FIG. 9 is a cross-sectional view of a force sensor according to another embodiment of the invention. In a force sensor 700 shown in FIG. 9, a sensing element 710, a top surface 710a, a bottom surface 710b, a sensing portion 712, a circuit board 720, conductive bumps 730, a gel 740, a first gel material 742, and a second gel material 744 have configurations and functions similar to those of the sensing element 310, the top surface 310a, the bottom surface 310b, the sensing portion 312, the circuit board 320, the conductive bumps 330, the gel 340, the first gel material 342, and the second gel material 344 of FIG. 5, and thus details thereof are not repeated hereinafter. A difference between the force sensor 700 and the force sensor 300 is that the circuit board 720 has an opening 720a that is aligned with the sensing portion 712 of the sensing element 710. A portion of the gel 740 (a portion of the first gel material 742 is depicted) is located in the opening 720a of the circuit board 720 and protrudes from the opening 720a. The gel 740 that protrudes from the opening 720a is adapted to receive an external force, so as to transfer the external force from the opening 720a of the circuit board 720 to the top surface 710a of the sensing element 710 to reach the sensing portion 712.

Figure 10:
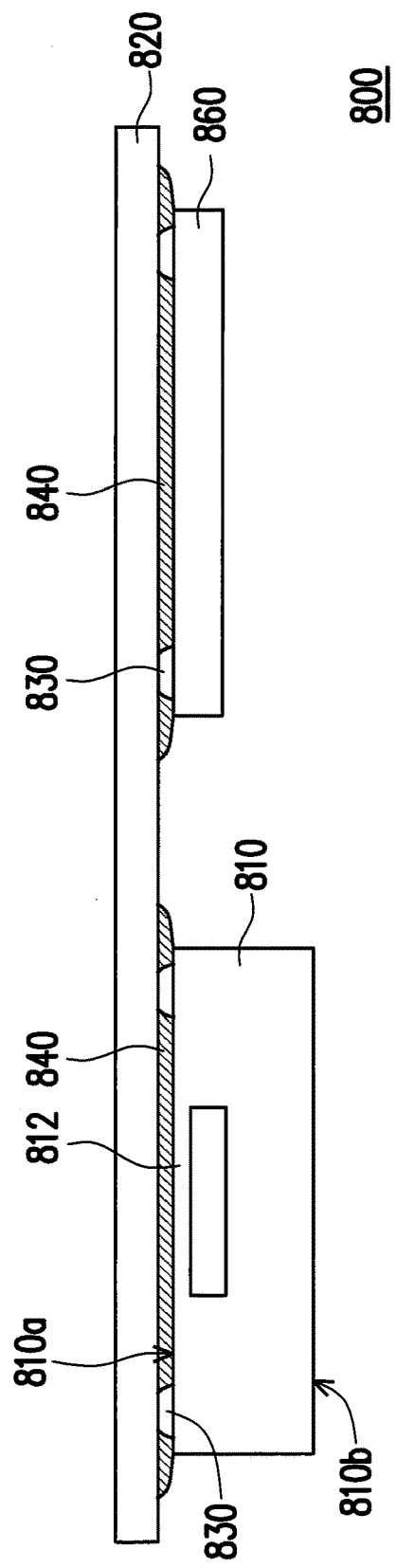
FIG. 10 is a cross-sectional view of a force sensor according to another embodiment of the invention.

FIG. 10 is a cross-sectional view of a force sensor according to another embodiment of the invention. In a force sensor 800 shown in FIG. 10, a sensing element 810, a top surface 810a, a bottom surface 810b, a sensing portion 812, a circuit board 820, conductive bumps 830, and a gel 840 have configurations and functions similar to those of the sensing element 210, the top surface 210a, the bottom surface 210b, the sensing portion 212, the circuit board 220, the conductive bumps 230, and the gel 240 of FIG. 4, and thus details thereof are not repeated hereinafter. A difference between the force sensor 800 and the force sensor 200 is that the force sensor 800 further includes a signal processor 860 that is disposed on the circuit board 820 and electrically connected to the circuit board 820. A portion of the conductive bumps 830 are disposed between the circuit board 820 and the signal processor 860, such that the signal processor 860 is electrically connected to the circuit board 820, and a portion of the gel 840 is disposed between the circuit board 820 and the signal processor 860 to cover the conductive bumps 830. A sensing signal from the sensing portion 812 of the sensing element 810 may be transmitted to the signal processor 860 through the circuit board 820 to be processed (e.g., conversion or noise filtering) in the signal processor 860.

Figure 11A:
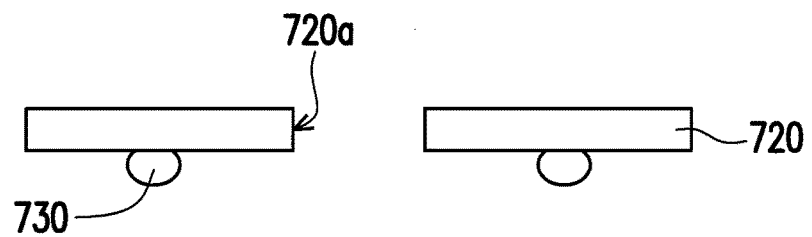
FIG. 11A to FIG. 11C illustrate a manufacturing process of a force sensor according to an embodiment of the invention.
Figure 11B:
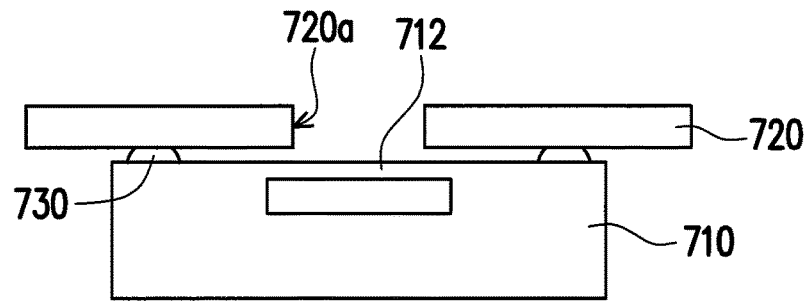
Figure 11C:
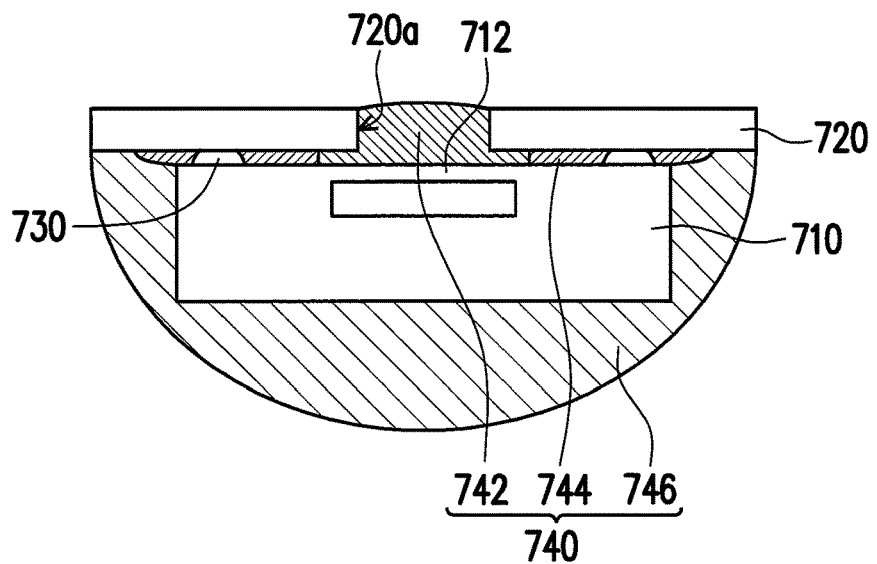

Hereinafter, the force sensor 700 of FIG. 9 is described as an example to illustrate a manufacturing process of the force sensor of the invention. FIG. 11A to FIG. 11C illustrate the manufacturing process of the force sensor according to an embodiment of the invention. First, as shown in FIG. 11A, the circuit board 720 having the opening 720a is provided, and the conductive bumps 730 are formed on a lower side of the circuit board 720. Then, as shown in FIG. 11B, the sensing element 710 including the sensing portion 712 is connected to the conductive bumps 730. Next, the gel 740 including the first gel material 742 and the second gel material 744 is formed between the circuit board 720 and the sensing element 710, so as to form the force sensor 700 as shown in FIG. 9. In addition, as shown in FIG. 11C, the third gel material 746 may be formed to cover the sensing element 710.

To conclude above, in the force sensor of the invention, the existing circuit board is disposed above the top surface of the sensing element, such that the sensing portion of the sensing element is shielded by the circuit board. Thus, in addition to performing the electrical function, the circuit board further serves as a structure that covers the sensing element and bears the pressing force. Accordingly, it is not required to additionally dispose a cover above the sensing element to protect the sensing element, and the sensing element of the force sensor is protected while the sensing performance thereof is maintained without increasing the overall thickness and production cost of the force sensor.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A force sensor, comprising:
   a sensing element having a top surface and a bottom surface opposite to each other and comprising a sensing portion, wherein the sensing portion is located at the top surface; and
   a circuit board disposed above the top surface and electrically connected to the sensing element, wherein the sensing portion is adapted to generate a sensing signal through an external force transferred from the circuit board to the top surface,
   a gel, covering at least a portion of the sensing element, wherein the gel comprises a first gel material and a second gel material, and the first gel material is aligned with the sensing portion and the second gel material surrounds the first gel material.

2. The force sensor according to claim 1, wherein the circuit board comprises a peripheral portion and a central portion, wherein the central portion is surrounded by the peripheral portion and is aligned with the sensing portion, and the sensing element supports the peripheral portion, and the sensing portion is adapted to generate the sensing signal through the external force transferred from the central portion to the top surface.

3. The force sensor according to claim 1, further comprising a plurality of conductive bumps disposed between the top surface and the circuit board, wherein the sensing element supports the circuit board through the conductive bumps and is electrically connected to the circuit board through the conductive bumps.

4. The force sensor according to claim 1, further comprising a signal processor, wherein the signal processor is disposed on the circuit board and electrically connected to the circuit board.

5. The force sensor according to claim 1, wherein the gel is filled between the top surface and the circuit board, and the external force is transferred to the sensing portion through the gel.

6. The force sensor according to claim 1, wherein the circuit board is a rigid circuit board or a flex circuit board.

7. The force sensor according to claim 1, wherein the gel comprises a third gel material, and the third gel material extends from the circuit board to the bottom surface to cover the sensing element.

8. The force sensor according to claim 1, wherein the circuit board has an opening, and the opening is aligned with the sensing portion and at least a portion of the gel is located in the opening and adapted to receive the external force.

9. The force sensor according to claim 8, wherein the gel protrudes from the opening.

10. The force sensor according to claim 1, wherein the circuit board is adapted to receive the external force.

11. The force sensor according to claim 1, further comprising a pressing element, wherein the pressing element is disposed on the circuit board and aligned with the sensing portion, and the pressing element is adapted to receive the external force.

* * * * *